(12) United States Patent
Brayman et al.

(10) Patent No.: US 8,561,790 B2
(45) Date of Patent: Oct. 22, 2013

(54) BELT DRIVE CONVEYOR WITH POWER TAP OFF

(75) Inventors: Matthew T. Brayman, Ada, MI (US); Ryan D. Tasma, Havelock North (NZ); Clinton R. Lupton, Caledonia, MI (US); Floyd W. Butler, Newaygo, MI (US)

(73) Assignee: Dematic Corp., Grand Rapids, MI (US)

( * ) Notice: Subject to any disclaimer, the term of this patent is extended or adjusted under 35 U.S.C. 154(b) by 367 days.

(21) Appl. No.: 12/891,868

(22) Filed: Sep. 28, 2010

(65) Prior Publication Data

US 2011/0233031 A1 Sep. 29, 2011

Related U.S. Application Data

(60) Provisional application No. 61/246,374, filed on Sep. 28, 2009.

(51) Int. Cl.
*B65G 23/14* (2006.01)
*B65G 47/10* (2006.01)
*B65G 47/46* (2006.01)

(52) U.S. Cl.
USPC ...... 198/833; 198/370.01; 198/575; 198/597; 198/781.01

(58) Field of Classification Search
USPC ............ 198/370.01, 370.03, 370.06, 370.09, 198/371.1, 371.2, 371.3, 465.1, 574, 575, 198/597, 688.1, 781.01
See application file for complete search history.

(56) References Cited

U.S. PATENT DOCUMENTS

| | | | |
|---|---|---|---|
| 2,622,447 A | 12/1952 | Murphy | |
| 3,456,773 A * | 7/1969 | Titmas, Jr. | 198/370.09 |
| 3,511,361 A * | 5/1970 | Urban | 198/457.02 |
| 3,643,788 A | 2/1972 | Werntz | |
| 3,987,683 A * | 10/1976 | Singh | 474/167 |
| 4,264,002 A | 4/1981 | Van Der Schie | |
| 4,319,675 A | 3/1982 | Turnbough | |
| 4,485,913 A * | 12/1984 | Treiber | 198/790 |
| 4,509,636 A | 4/1985 | Godbois | |
| 4,541,520 A | 9/1985 | Greenlee, III | |
| 4,565,283 A | 1/1986 | Greenlee, III | |
| 4,730,718 A | 3/1988 | Fazio et al. | |
| 4,746,003 A * | 5/1988 | Yu et al. | 198/367 |
| 4,792,034 A * | 12/1988 | Leemkuil | 198/370.09 |
| 4,822,184 A * | 4/1989 | Kawashima et al. | 400/616.1 |
| 4,832,184 A | 5/1989 | DeGood | |
| 4,880,099 A | 11/1989 | Leemkuil et al. | |
| 5,086,906 A | 2/1992 | Ludke | |

(Continued)

OTHER PUBLICATIONS

International Search Report and Written Opinion of the International Searching Authority from corresponding Patent Cooperation Treaty (PCT) Application No. PCT/US10/50466, mailed Nov. 19, 2010.

*Primary Examiner* — Gene Crawford
*Assistant Examiner* — Lester Rushin
(74) *Attorney, Agent, or Firm* — Gardner, Linn, Burkhart & Flory, LLP (57) ABSTRACT

A conveyor system includes a transport member having a conveying surface that is configured to transport articles in a transport direction, an endless strip and a drive for propelling the endless strip. A power tap off is provided between the strip and the transport member. The power tap off has an input that is driven by the strip and an output that drives the transport member. The power tap off provides a positive transfer of power from the strip to the transport member.

19 Claims, 9 Drawing Sheets

(56) References Cited

U.S. PATENT DOCUMENTS

| | | | |
|---|---|---|---|
| 5,531,311 A | 7/1996 | LeMay et al. | |
| 6,193,054 B1 | 2/2001 | Henson et al. | |
| 6,469,729 B1* | 10/2002 | Ryan | 347/248 |
| 6,644,459 B2* | 11/2003 | van Leeuwen et al. | 198/370.1 |
| 6,811,018 B2 | 11/2004 | Cotter et al. | |
| 6,889,822 B1 | 5/2005 | Wagner et al. | |
| 6,899,219 B2 | 5/2005 | Cotter et al. | |
| 7,040,478 B2 | 5/2006 | Ehlert | |
| 7,093,709 B2 | 8/2006 | Cotter et al. | |
| 7,131,904 B2* | 11/2006 | Shefet et al. | 452/51 |
| 7,364,035 B2* | 4/2008 | German et al. | 198/781.03 |
| 7,383,935 B2 | 6/2008 | Tasma et al. | |
| 7,387,195 B2* | 6/2008 | Bonham et al. | 198/370.01 |
| 7,422,098 B2* | 9/2008 | Bonham et al. | 198/447 |
| 7,467,708 B2 | 12/2008 | McGettigan et al. | |
| 7,556,144 B2 | 7/2009 | Cotter et al. | |
| 7,581,632 B2* | 9/2009 | Wallace et al. | 198/370.08 |
| 7,611,006 B2 | 11/2009 | Moore et al. | |
| 2003/0062249 A1* | 4/2003 | Cotter et al. | 198/835 |
| 2006/0076216 A1 | 4/2006 | Wagner et al. | |

* cited by examiner

BELT DRIVE CONVEYOR WITH POWER TAP OFF

CROSS REFERENCE TO RELATED APPLICATION

This application claims priority from U.S. provisional patent application Ser. No. 61/246,374, filed on Sep. 28, 2009, the disclosure of which is hereby incorporated herein by reference in its entirety.

BACKGROUND OF THE INVENTION

The present invention is directed to a conveyor system that transports articles on a conveyor surface in a transport direction. While not limited thereto, the invention may be useful with such a system that is capable of sorting articles selectively to takeaway conveyors, chutes or the like.

One type of sortation system utilizes a series of elongated strip belts spaced apart across a conveyor belt and extending the length of the conveyor in order to convey articles past a series of right angle transfers units. Each transfer unit includes a series of pop up rollers positioned between the strip belts that are capable of selectively transferring an article to a takeaway conveyor, chute or the like. When an article is transported along the strip belts, the rollers of a particular transfer unit are elevated in response to a signal from an article detector at that transfer unit. The article is lifted off of the strip belts and diverted.

Such known sortation system is relatively inflexible in design. The right angle transfer units can only be placed at certain locations along the system and the overall length of the system is limited by the available lengths of the strip belts. Also, when a strip belt breaks or is warn out, the entire system must be accessed in order to replace the belt.

SUMMARY OF THE INVENTION

The present invention is directed to a conveying system that provides flexibility of configuration as well as synchronized operation of the various components making up the conveying system.

A conveyor system, according to an aspect of the invention, includes a transport member having a conveying surface that is configured to transport articles in a transport direction, an endless strip and a drive for propelling the endless strip. A power tap off is provided between the strip and the transport member. The power tap off has an input that is driven by the strip and an output that drives the transport member. The power tap off provides a positive transfer of power from the strip to the transport member.

The power tap off input may include a drum that is rotated by the strip. The power tap off output may include a spool that is rotated by the drum and an endless member between the spool and the transport member. The power tap off input may include at least one roller that increases contact between the strip and the drum. The endless member may be a grooved belt, such as a poly-V belt. The power tap off may provide a reduction in speed between the strip and the conveying surface. The endless strip may be an endless belt.

The transport member may include a transport surface of a diverter unit. The transport surface of the diverter unit may include a plurality of transport strip belts that are interspersed between a plurality of transfer rollers of a right angle transfer. A pair of support rollers may be provided to moveably support the plurality of transport strip belts with the power tap off driving one of the support rollers. One of the support rollers may have a crowned surface at each of the strip belts to track that belt. The crowned surface may be defined by an elastic band that is stretched over that roller. Alternatively, the transport surface of the diverter may be a plurality of transport rollers that are interspersed between a plurality of transfer strip belts of a right angle transfer.

The transport member may be a transport belt of a transport belt unit. The transport belt may be supported by a lead support roller and a trailing support roller with the power tap off driving one of the support rollers. A plurality of the transport belt units may be interspersed with a plurality of the diverter units.

A control system may be included that has a product detector at an upstream end of the conveyor system and an encoder to track movement of the conveying surface. This allows articles to be tracked without the need for product detectors at each of the diverter positions.

A conveyor system, according to another aspect of the invention, includes a transport member that is configured to transport articles in a transport direction. The transport member is divided into a plurality of tandem units each having a conveying surface. One or more of the tandem units is a transport belt unit having a segmented conveyor belt defining the conveying surface for the transport belt unit. One or more of the tandem units is a diverter unit having a plurality of strip belts and a plurality of rollers between the strip belts. Either the strip belts or the rollers define the conveying surface for the diverter unit. The other of the strip belts and rollers makes up a diverting surface. An endless strip extends below the transport member and may extend substantially the length of the transport member. A drive propels the endless strip. A plurality of power tap offs are provided, each for one of the tandem units. Each of the power tap offs has an input that is driven by the endless strip and an output that drives the conveying surface for the associated one of the tandem units. Each of the power tap offs provides a positive transfer of power from the strip to the conveying surface for the associated one of the tandem units. In this manner, synchronized operation of the conveying surfaces is provided.

The strip belts of the diverter unit may be supported by a pair of support rollers with the power tap off driving one of the support rollers. One or both of the support rollers may have a crowned surface at each of the plurality of strip belts to track that strip belt. The crowned surface may be made up of an elastic band stretched over the support roller.

The segmented conveyor belt may be supported by either a plurality of rollers or a slider plate. The segmented conveying belt may be moveably supported by a lead roller and a trailing roller. The power tap off may drive the lead or trailing roller.

The power tap off input may be a drum that is rotated by the strip. The power tap off output may be a spool that is rotated by the drum and an endless member between the spool and the conveying surface. The power tap off input may include at least one roller that increases contact between the strip and the drum. The endless member may be a grooved belt, such as a poly-V belt. The power tap off may provide a reduction in speed between the strip and the conveying surface. The endless strip may be in the form of an endless belt.

A control system may be included that has a product detector at an upstream end of the conveyor system and an encoder to track movement of the conveying surface. This allows articles to be tracked without the need for product detectors at each of the diverter positions.

These and other objects, advantages and features of this invention will become apparent upon review of the following specification in conjunction with the drawings.

DESCRIPTION OF THE PREFERRED EMBODIMENT

Figure 1:
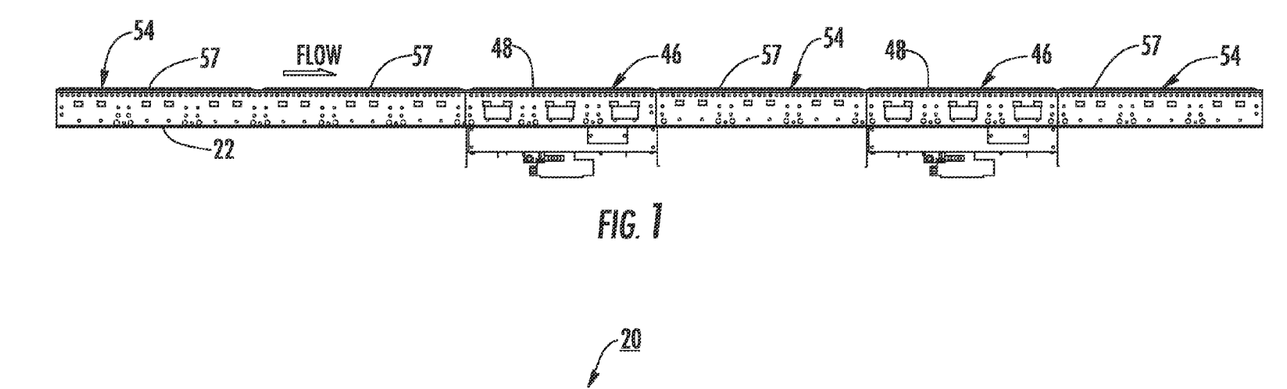
FIG. 1 is a side elevation of a conveyor system according to the invention.
Figure 12:
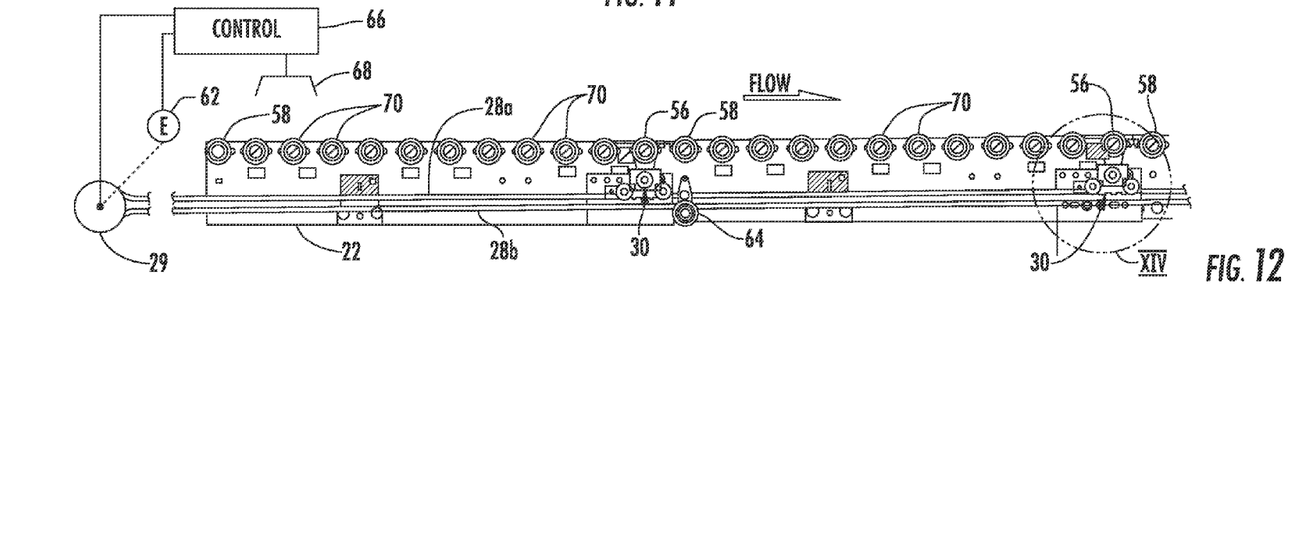
FIG. 12 is a sectional view taken along the lines XII-XII in FIG. 11.
Figure 13:
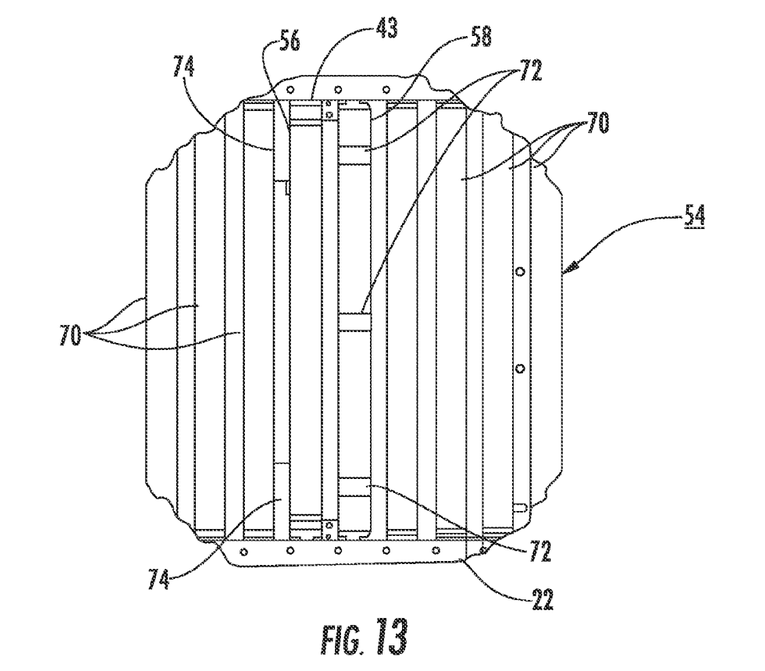
FIG. 13 is an enlarged view of the area designated XIII in FIG. 11 with the conveyor belts removed to review details the support rollers.
Figure 14:
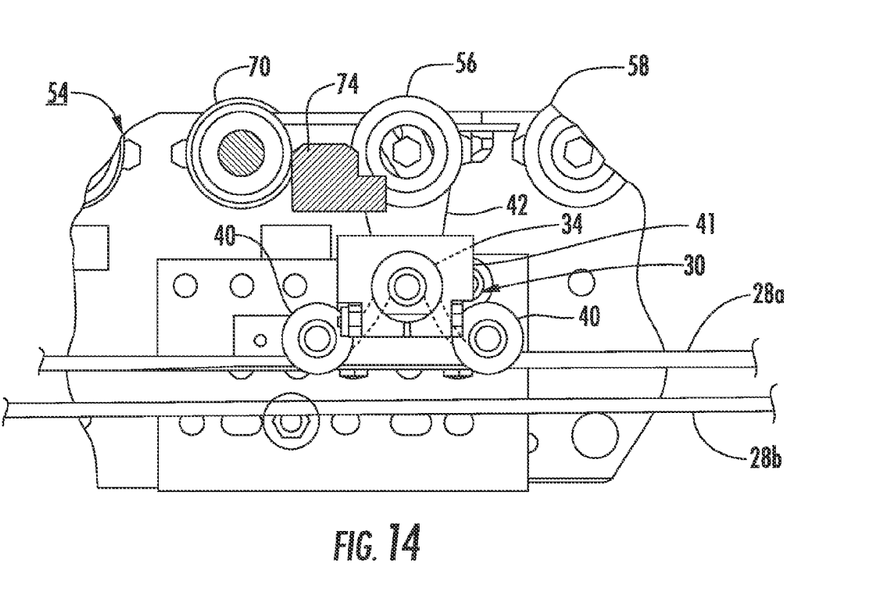
FIG. 14 is an enlarged view of the area designated XIV in FIG. 12.

Referring now to the drawings and the illustrative embodiments depicted therein, a conveyor system 20 includes a frame 22 and a transport member 24 that defines a conveying surface 26 that is configured to transport articles in a transport direction, an endless strip 28 and a drive unit 29 for propelling endless strip 28 (FIGS. 1 and 12). Conveyor system 20 further includes at least one power tap off 30 between strip 28 and transport member 24. Power tap off 30' has an input 32 that is driven by strip 28 and an output 36 that drives transport member 24. As will be explained in more detail below, power tap off 30 provides a positive transfer of power from strip 28 to transport member 24.

Power tap off input 32 may be made up of a drum 34 that is rotated by strip 28 and may include one or more rollers 40 to deflect strip 28 around drum 34 in order to increase the amount of contact between the strip and the drum to thereby increase the friction between the strip and the drum. Power tap off output 36 may further include a spool 38 that is rotated by drum 34, both of which are rotatably supported by bearings in a mounting block 41. An endless member 42 transfers rotational motion from spool 38 to a roller 45 that drives a portion of conveying surface 26 of transport member 24. In particular, a portion of conveying surface 26 is driven by a roller 45 via a spool 43 that is joined with roller 45. In the illustrated embodiment, endless member 42 is a grooved transmission member, such as a poly-V Belt® that is available commercially from Hutchinson Worldwide. In the illustrated embodiment power tap off 30 provides a reduction in speed between strip 28 and conveying surface 26. This may be accomplished by selection of the respective diameters of drum 34, spool 38 and spool 43 to cause conveying surface 26 to travel slower than strip 28. This reduces the amount of stress on strip 28 as would be understood by the skilled artisan. In the illustrated embodiment, the speed reduction is 1.33:1 although a greater or lesser ratio could be chosen.

In the illustrative embodiment, endless strip 28 is an endless belt having an upper run 28a that engages power tap off 30 and a lower run 28b that is supported by pulleys 64, although it may take various forms such as a chain or the like. Such belt is available from Nitta Corporation. While in the illustrative embodiment, drum 34 is directly connected with spool 38, it is possible to provide a clutch, such as an electromagnetic clutch (not shown) between the two. This would allow for an accumulation function whereby power is selectively transferred from strip 28 to transport member by selective electrical actuation of the clutch as would be understood by the skilled artisan.

Figure 2:
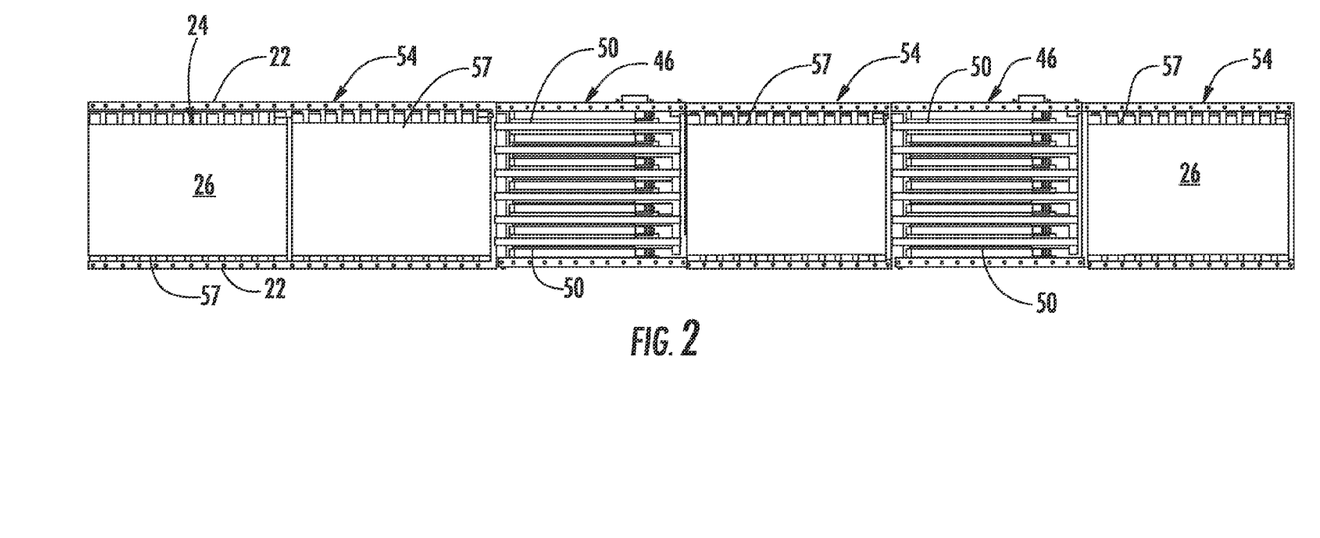
FIG. 2 is a top plan view of the conveyor system in FIG. 1.
Figure 3:
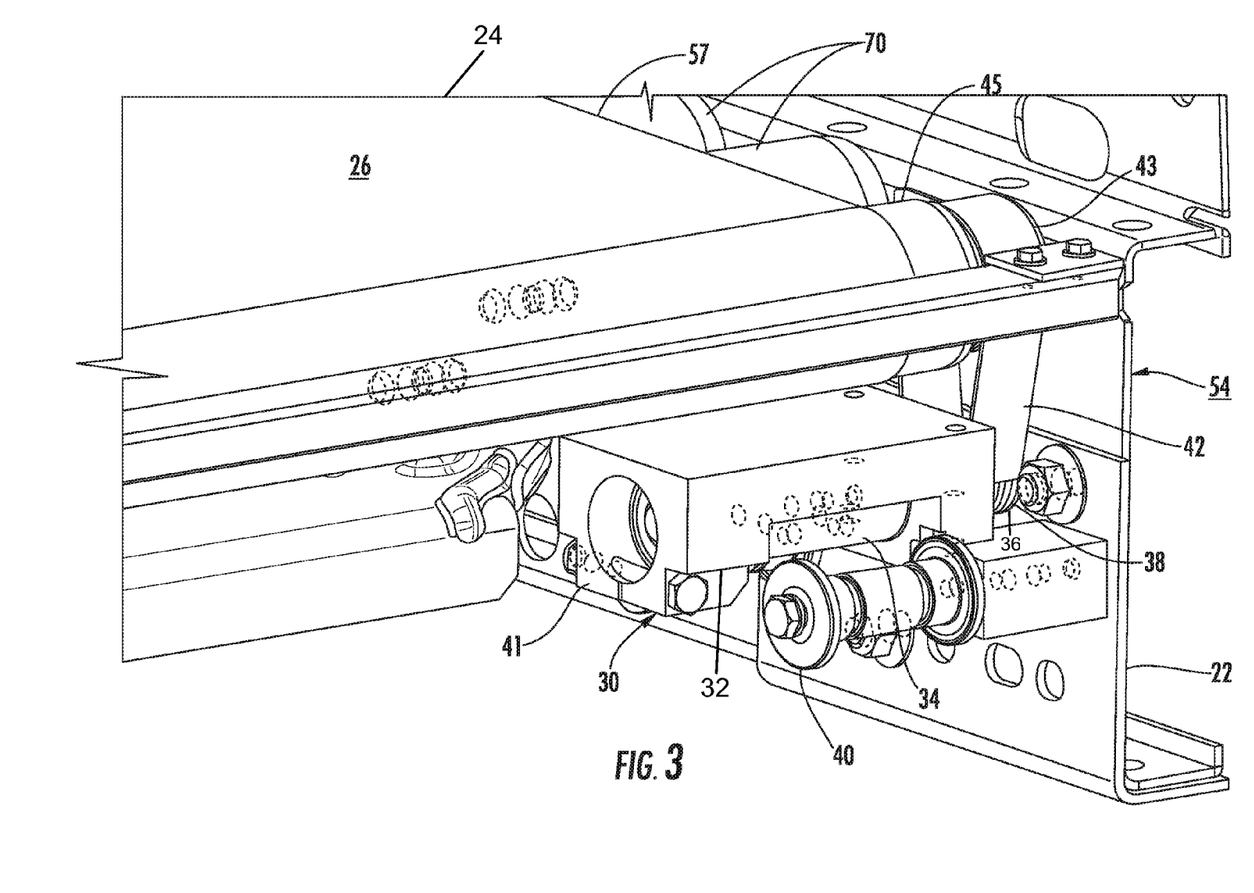
FIG. 3 is a perspective view of a portion of a belt transport unit with the endless strip removed to reveal details of the power tap off.
Figure 4:
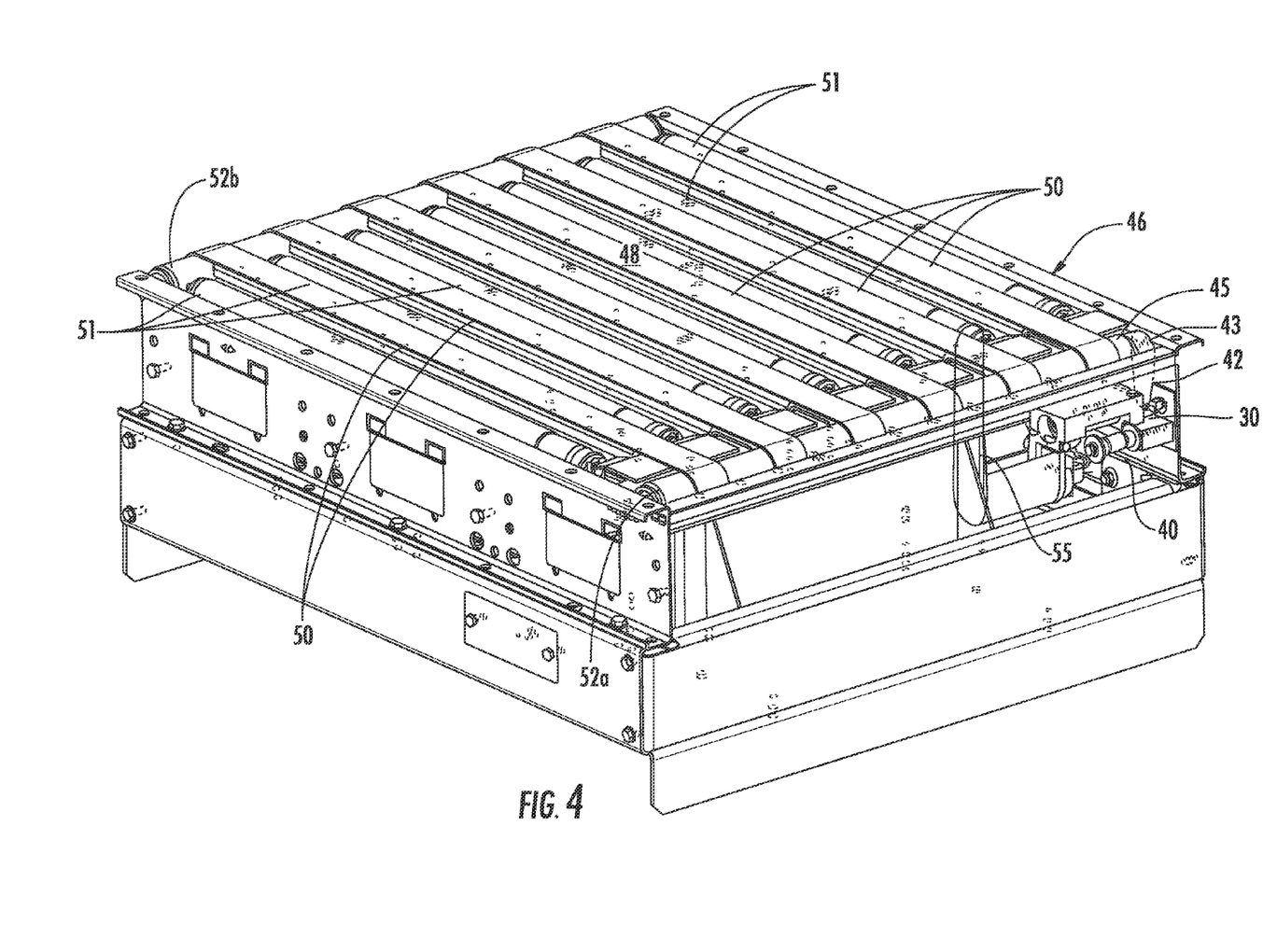
FIG. 4 is a perspective view of a diverter assembly with the endless strip removed to reveal details of the power tap off.
Figure 5:
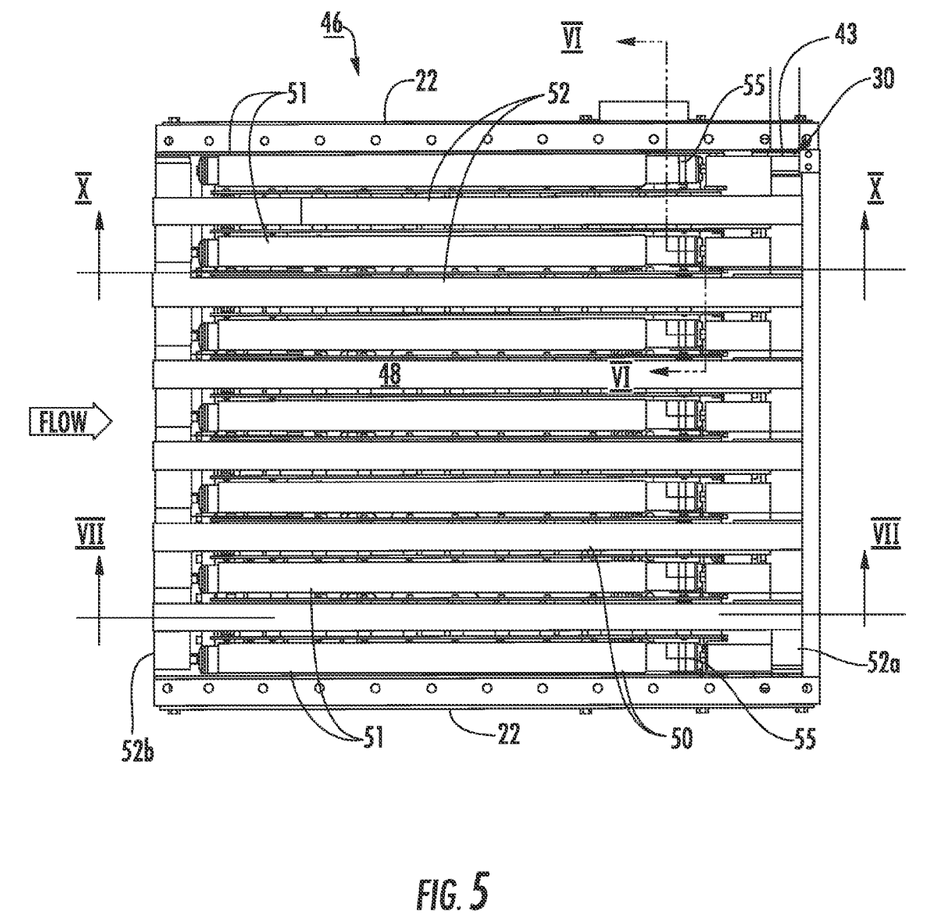
FIG. 5 is a top plan view of the diverter assembly in FIG. 4.
Figure 6:
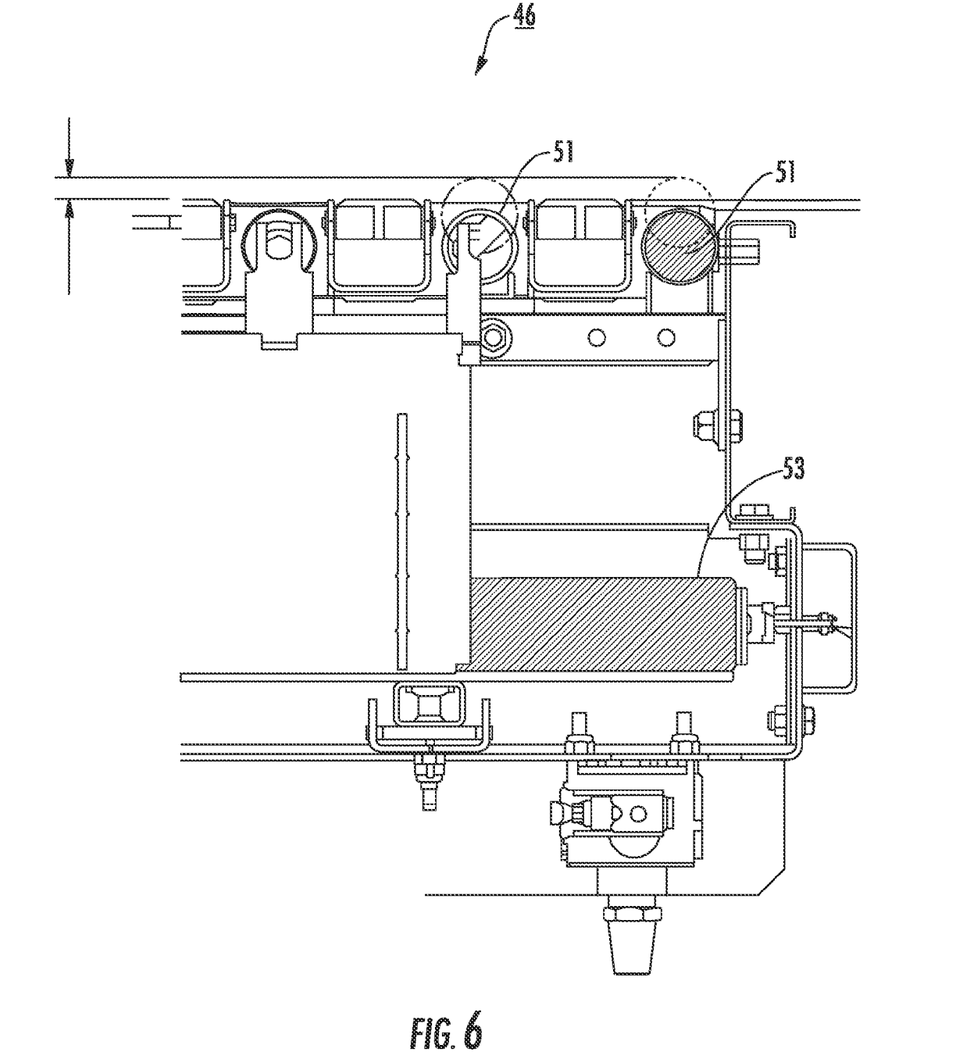
FIG. 6 is a sectional view taken along the lines VI-VI in FIG. 5.
Figure 7:
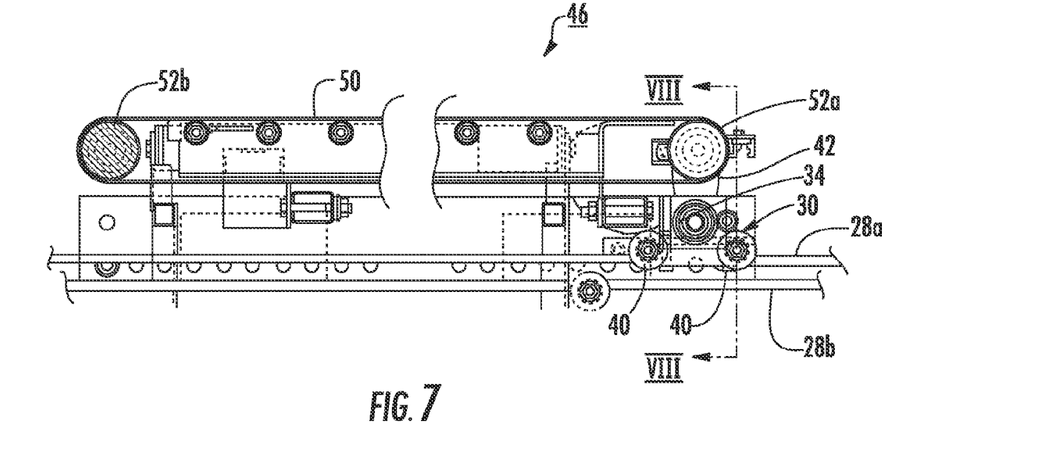
FIG. 7 is a sectional view taken along the lines VII-VII in FIG. 5.
Figure 8:
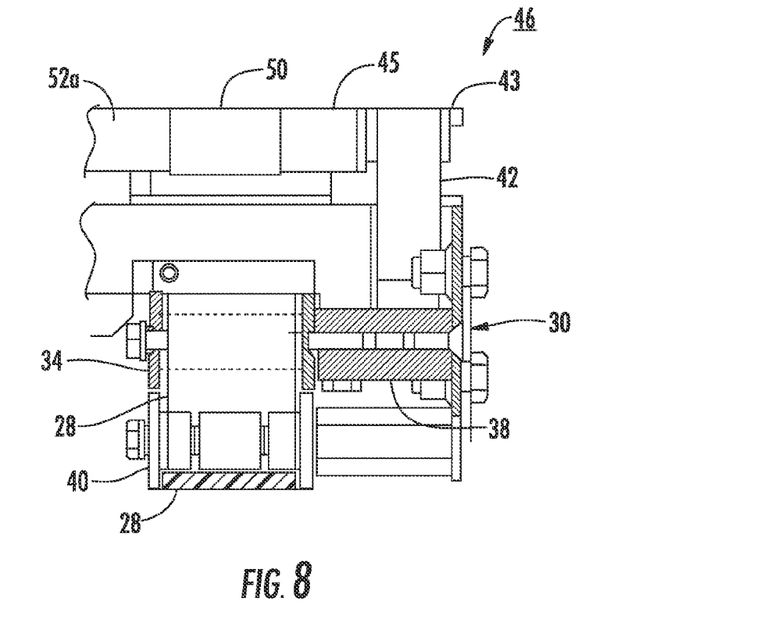
FIG. 8 is a sectional view taken along the lines VIII-VIII in FIG. 7.
Figure 9:
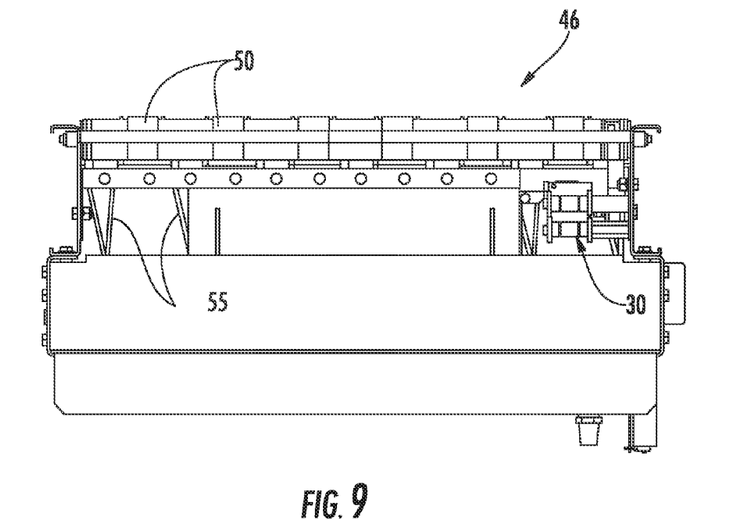
FIG. 9 is an end elevation of the diverter assembly in FIG. 4.
Figure 10:
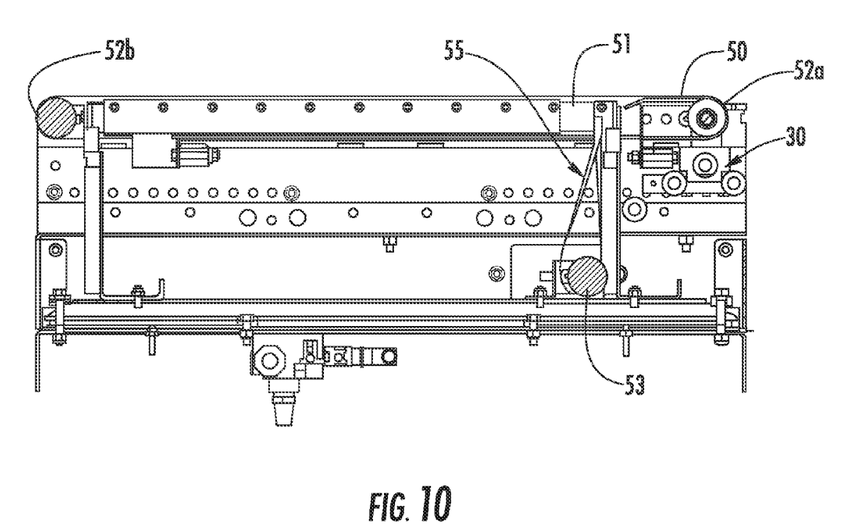
FIG. 10 is a sectional view taken along the lines X-X in FIG. 5.
Figure 11:
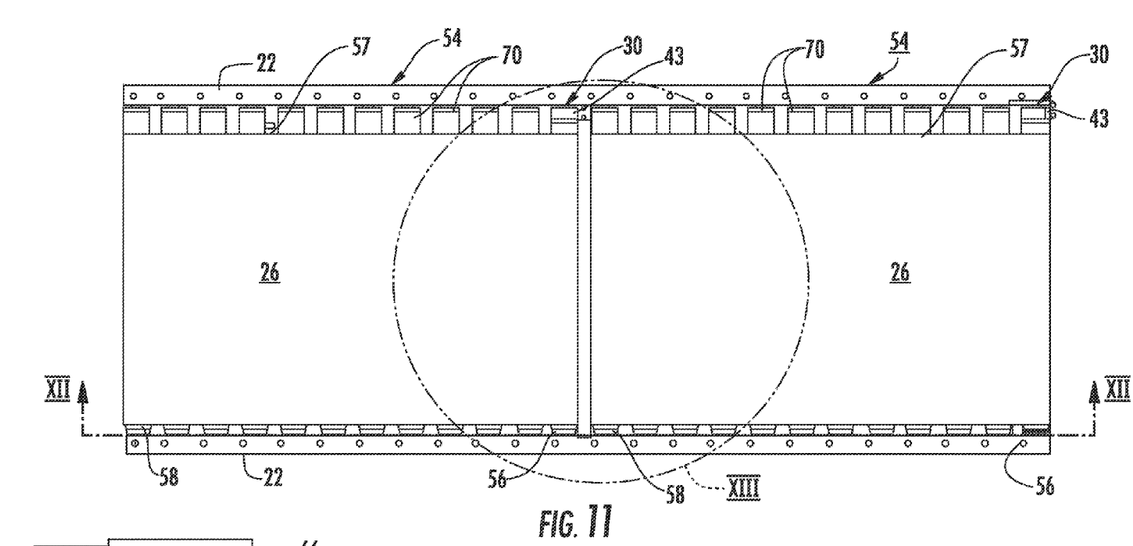
FIG. 11 is a top plan view of a pair of adjacent transport conveyors at an upstream end portion of the conveyor system.

Transport member 24 may be divided into a plurality of units, as seen in FIGS. 1 and 2. Some of the units may be a diverter unit 46. In the illustrated embodiment, diverter unit 46 is a right-angle transfer (RAT) but could also be a steered wheel diverter, a pop-up wheel diverter or the like. In the illustrated embodiment, the portion of conveying surface 24 at diverter unit 46 is a transport surface 48 that is made up of a plurality of strip belts 50 that are interspersed between transfer members 51 of the right angle transfer. In the illustrated embodiment, transfer members 51 are rollers that are driven by a powered roller 53 and elastic bands 55, such as disclosed in commonly assigned U.S. Pat. No. 7,383,935, the disclosure of which is hereby incorporated by reference. However, it should be understood that transport surface 48 may, alternatively, be made up of rollers driven by power tap off 30 and transfer members 51 may, alternatively, be strip belts driven by power roller 53. In the illustrated embodiment, transport surface 48 is supported by a pair of support rollers 52a, 52b wherein strip belts 50 are moveably supported by rollers 52a, 52b. In such application, one of rollers 52a, 52b defines roller 45 and spool 43 is connected with one of rollers 52a, 52b. One or both of said pair of rollers 52a, 52b has a crowned surface (not shown) at each strip belt 50 in order to track the corresponding one of said plurality of belts. In the illustrated embodiment, each crowned surface may be made up of an elastic band stretched over said at least one of rollers 52a, 52b.

One or more of the plurality of tandem units making up transport member 24 may be a belt transport unit, or segmented belt unit, 54 in which a segmented belt 57 is moveably supported by a lead roller 56 and a trailing roller 58 and wherein power tap off 30 drives one of support rollers 56, 58 which defines roller 45. Belt 57 may be of the type disclosed in commonly assigned U.S. Pat. No. 6,811,018, the disclosure of which is hereby incorporated herein by reference. Alternatively, belt 57 may be a more conventional belt with a conventional modulus of elasticity in combination with a take-up device. Segmented belt 57 may be supported between support rollers 56, 78 by load support roller 70 or, alternatively, by a slider plate as known in the art. An advantage of such construction is that belt 57 may extend across a much greater width of frame 22 than possible if strip 28 were to directly drive the rollers 56, 58. This is because the input portion 32 of power tap off 30 that engages strip 28 may be below belt 57 thereby allowing the belt to extend over the strip. Only the output 36 of power tap off 30 need to be laterally outside of belt 57, which is a much smaller portion of the width of frame 22. Rollers 56 and/or 58 include one or more crowned surfaces 72 in order to help track belt 57. Each crowned surface 72 may be made up of an elastic band stretched over roller 56/58. A finger guard 74 may be positioned between adjacent rollers and adjacent power tap off 30.

In one application, that is illustrated herein, transport member 24 may be made up of a plurality of tandem units including segmented belt units 54 that are interspersed with a plurality of diverter units 46. Because belts 57 of the segmented belt units 54 are positively driven by the same strip 28 that positively drives the strip belts 50 of diverter units 46, the entire conveying surface 26 can be driven at a constant speed along the conveying surface. This ensures that articles travelling on the conveying surface will maintain their respective spacing notwithstanding variation in the speed of conveying surface 26 as may occur due to variation in loading of drive unit 29. Thus, once articles are inducted to conveyor system 20 it can be concluded that the spacing will not change. Also, the modularity of conveyor system 20 allows diverter units to be located at essentially any position along the conveyor system. Indeed, variability of positioning of diverter units 47 down to one inch or less is possible by varying the lengths and arrangement of segmented belt units 54.

Conveyor system 20 also allows a more simplified control because the articles can be tracked by a pulse position encoder 62 connected with transport member 24 either directly or by connection with drive 29 or strip 28. Thus, conveyor system may include a control 66 that includes a product detector 68, such as a photo eye, camera or scanner, at an upstream end of the conveyor system and encoder 62 to track movement of either endless strip 28 or conveying surface 26, because they are positively engaged with each other. By positive engagement is meant that there is no appreciable slip between strip 28 and conveying surface 26. In the illustrative embodiment, strip 28 may be supplied, for example, in any length up to 600 feet or more which allows conveying surface 26 to have a length of at least approximately 200 feet and up to 300 feet or more.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A modular conveyor system, comprising
   a transport member having a conveying surface that is configured to transport articles in a transport direction, said transport member divided into a plurality of tandem units each having a conveying surface;
   an endless strip extending along said transport member and a drive for propelling said endless strip; and
   a power tap off between said strip and said transport member, said power tap off having an input that is driven by said strip and an output that drives said transport member, wherein said power tap off provides a positive transfer of power from said strip to said transport member;
   at least one of said tandem units comprising a diverter, wherein said transport member comprises a transport surface of said diverter, wherein said transport surface of said diverter comprises a plurality of belts that are interspersed between transfer members of a right angle transfer, wherein said plurality of belts are moveably supported by a pair of rollers wherein said power tap off drives one of said pair of rollers and wherein said diverter can be positioned at substantially any location along said transport member, wherein at least one of said pair of rollers has a crowned surface at each of said plurality of belts to track the corresponding one of said plurality of belts, wherein each said crowned surface comprises an elastic band stretched over said at least one of said pair of rollers.

2. The conveyor system as claimed in claim 1 wherein said power tap off input comprises a drum that is rotated by said strip and said power tap off output comprises a spool that is rotated by said drum and an endless member between said spool and said transport member.

3. The conveyor system as claimed in claim 2 wherein said power tap off input comprises at least one roller that increases contact between said strip and said drum.

4. The conveyor system as claimed in claim 2 wherein said endless member comprises a grooved belt.

5. The conveyor system as claimed in claim 1 wherein said power tap off provides a reduction in speed between said strip and said conveying surface.

6. The conveyor system as claimed in claim 1 wherein said endless strip comprises an endless belt.

7. The conveyor system as claimed in claim 1 wherein said transport member further comprises a segmented belt unit that is moveably supported by a lead roller and a trailing roller and wherein said power tap off drives one of said lead and trailing roller.

8. The conveyor system as claimed in claim 7 wherein said tandem units further comprise a plurality of segmented belt units and a plurality of said diverters wherein said segmented belt units are interspersed with said plurality of diverters.

9. The conveyor system as claimed in claim 8 including a control, said control comprising a product detector at an upstream end of said conveyor system and an encoder to track movement of said endless strip or said transport member.

10. A modular conveyor system, comprising
    a transport member that is configured to transport articles in a transport direction, said transport member being divided into a plurality of tandem units each having a conveying surface, at least one of said tandem units comprising a transport belt unit having a segmented conveyor belt defining said conveying surface for said transport belt unit, at least one of said tandem units comprising a right-angle diverter unit having a plurality of strip belts and a plurality of rollers between said strip belts, one chosen from said strip belts and said rollers defining said conveying surface for said diverter unit and the other chosen from said strip belts and said rollers comprising a diverting surface;
    an endless strip extending along and below said transport member; and
    a plurality of power tap offs, each for one of said tandem units, each of said power tap offs having an input that is driven by said endless strip and an output that drives said conveying surface for the associated one of said tandem units, wherein each of said power tap offs provides a positive transfer of power from said strip to said conveying surface for the associated one of said tandem units in order to provide a common article transportation speed among said conveying surfaces along said transport member and wherein said diverter unit can be positioned at substantially any location along said transport member, wherein said strip belts are supported by a pair of support rollers, wherein said power tap off drives one of said pair of support rollers, wherein at least one of said pair of support rollers has a crowned surface at each of said plurality of strip belts to track the corresponding one of said strip belts, wherein each said crowned surface comprises an elastic band stretched over said at least one of said pair of support rollers.

11. The conveying system as claimed in claim 10 wherein said segmented conveyor belt is supported by either a plurality of rollers or a slider plate.

12. The conveyor system as claimed in claim 11 wherein said segmented conveying belt is moveably supported by a lead roller and a trailing roller and wherein said power tap off drives one of said lead and trailing rollers.

13. The conveyor system as claimed in claim 10 wherein said power tap off input comprises a drum that is rotated by said strip and said power tap off output comprises a spool that is rotated by said drum and an endless member between said spool and said conveying surface.

14. The conveyor system as claimed in claim 13 wherein said power tap off input comprises at least one roller that increases contact between said strip and said drum.

15. The conveyor system as claimed in claim 13 wherein said endless member comprises a grooved belt.

16. The conveyor system as claimed in claim 10 wherein said power tap off provides a reduction in speed between said strip and said conveying surface.

17. The conveyor system as claimed in claim 10 wherein said endless strip comprises an endless belt.

18. The conveyor system as claimed in claim 10 including a control, said control comprising a product detector at an upstream end of said conveyor system and an encoder to track movement of said transport member.

19. The conveyor system as claimed in claim 10 wherein said endless strip extends substantially the length of said transport member and a drive for propelling said endless strip.

* * * * *